(12) United States Patent
McDonald

(10) Patent No.: US 11,275,686 B1
(45) Date of Patent: Mar. 15, 2022

(54) ADJUSTABLE WRITE POLICIES CONTROLLED BY FEATURE CONTROL REGISTERS

(71) Applicant: CENTAUR TECHNOLOGY, INC., Austin, TX (US)

(72) Inventor: Thomas C. McDonald, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 24 days.

(21) Appl. No.: 17/092,683

(22) Filed: Nov. 9, 2020

(51) Int. Cl.
*G06F 12/0806* (2016.01)
*G06F 7/58* (2006.01)

(52) U.S. Cl.
CPC .......... *G06F 12/0806* (2013.01); *G06F 7/582* (2013.01); *G06F 2212/62* (2013.01)

(58) Field of Classification Search
CPC ... G06F 12/0806; G06F 2212/62; G06F 7/582
USPC .......................................................... 711/118
See application file for complete search history.

(56) References Cited

U.S. PATENT DOCUMENTS

2015/0331691 A1* 11/2015 Levitan ................. G06F 9/3848
                                                     712/240
2019/0361707 A1* 11/2019 Vougioukas ........ G06F 9/30145
2021/0382718 A1* 12/2021 Agrawal ............. G06F 9/30058

* cited by examiner

*Primary Examiner* — Hashem Farrokh
(74) *Attorney, Agent, or Firm* — McClure, Qualey & Rodack, LLP

(57) ABSTRACT

In one embodiment, a microprocessor, comprising: prediction logic comprising a branch predictor comprising a group of multi-set associative tables, each of the tables corresponding to branch pattern histories of different lengths; and control logic configured to provide an adjustable write policy for the prediction logic.

20 Claims, 6 Drawing Sheets

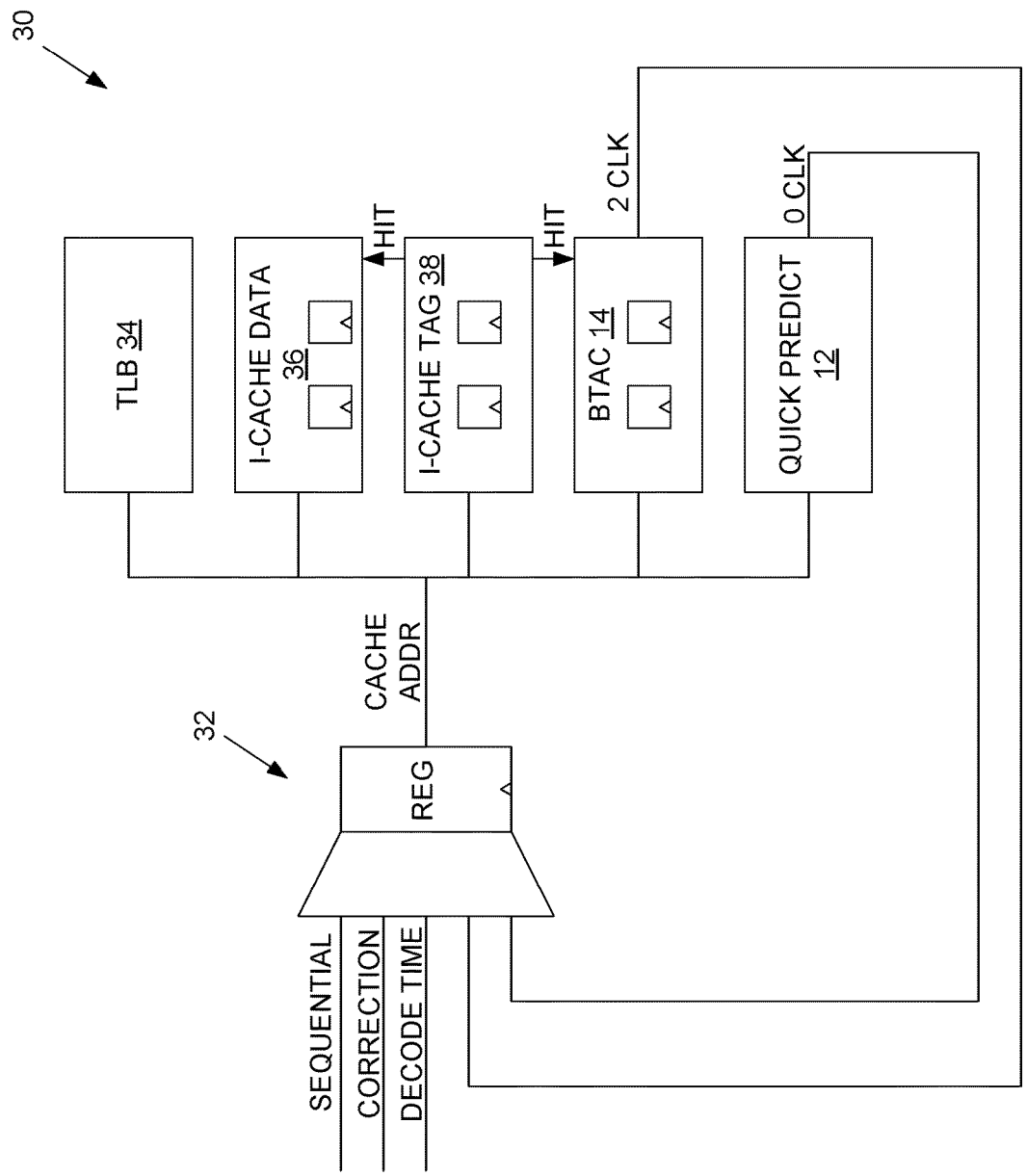

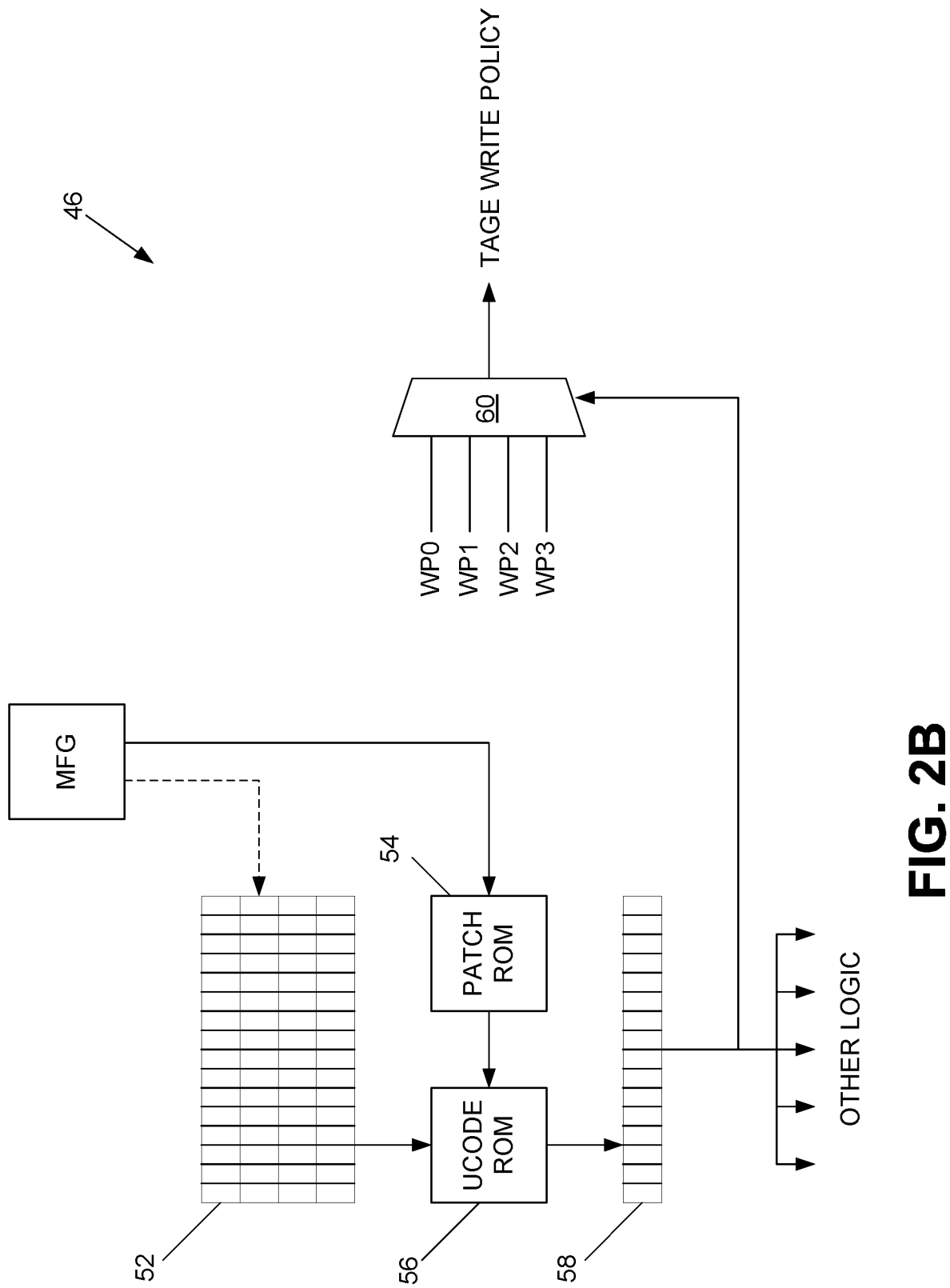

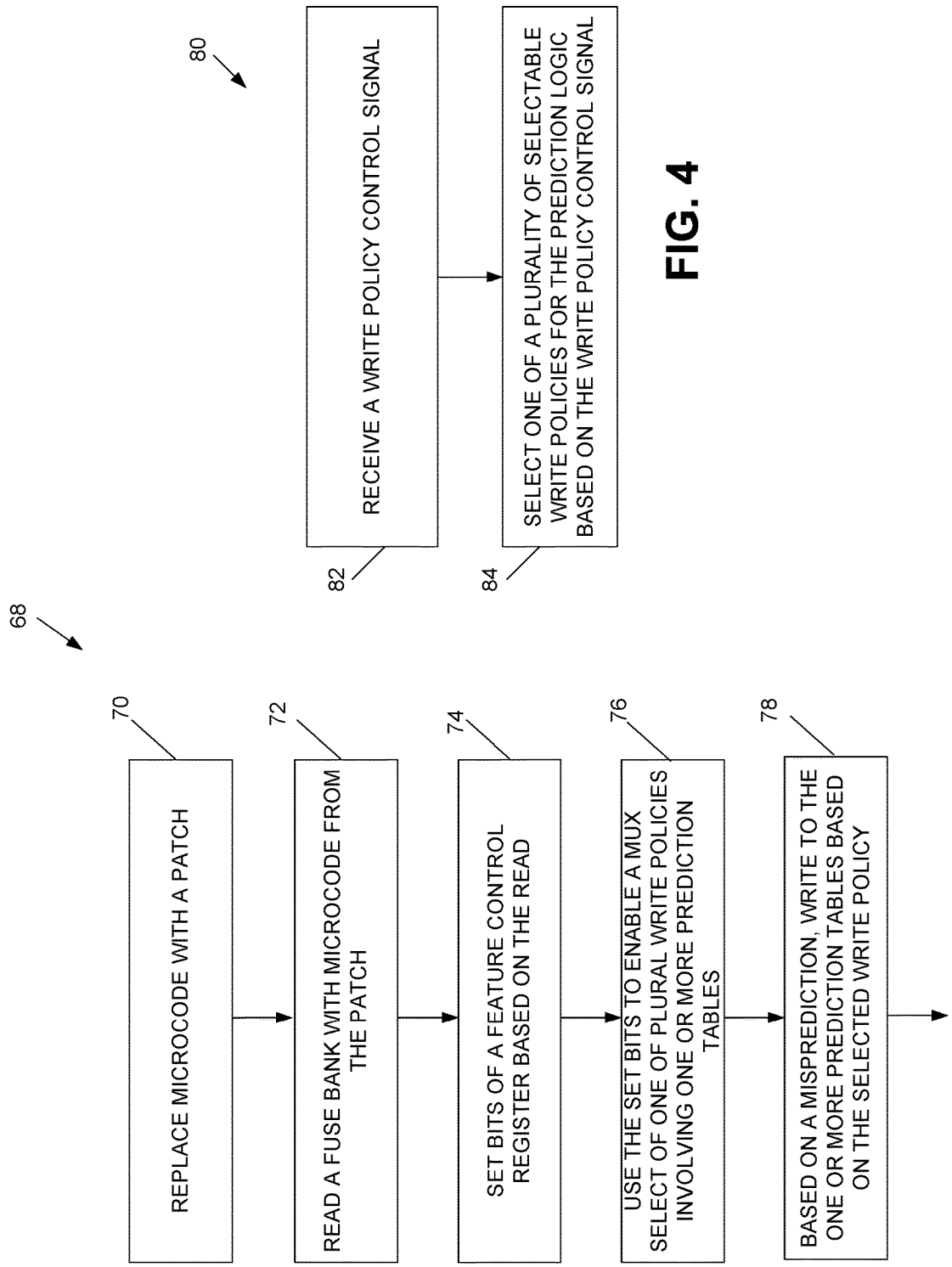

ADJUSTABLE WRITE POLICIES CONTROLLED BY FEATURE CONTROL REGISTERS

TECHNICAL FIELD

The present invention relates in general to microprocessors, and in particular, branch prediction in microprocessors.

BACKGROUND

Microprocessors today operate using a pipelined processing scheme whereby programming instructions are broken down into steps that are carried out concurrently throughout a plurality of stages of the pipeline. Instructions typically (e.g., 10-20% of programming code) comprise branch instructions, or simply branches, which include unconditional branches (e.g., branches that are always taken) and conditional branches (e.g., taken or not taken depending on evaluation of a specified condition). It is generally not known for certain whether a conditional jump will be taken or not taken until the condition has been calculated and the conditional jump has passed the execution stage in the instruction pipeline, which may cause delays in fetching the next instruction. Branch predictors have been developed that attempt to guess, at the front end of the pipeline, which direction (taken, not taken) a conditional branch will go and to what target address, and in doing so, improve the flow of instructions through the pipeline.

One branch predictor that is commonly used in microprocessors is referred to as a branch target address cache (BTAC). The BTAC comprises hardware logic that may include the use of a global history pattern of past branch instruction behavior to enable a prediction of a target address for a fetched branch instruction. In general, branch predictors for the BTAC may comprise a plurality of predictor tables used in conjunction with plural, multi-set associative cache memories or sides often denoted by letters, such as in the case of two cache memories of the BTAC, sides A and B. Each side may comprise multiple ways (e.g., 2-way, 4-way, etc.). Information for some example BTAC arrays may be found in U.S. Pat. Nos. 8,832,418 and 7,707,397. For a given cache fetch (e.g., sixteen (16) byte fetch of a cache line in an instruction cache), there may be more than a single branch instruction. For a BTAC with sides A and B and a cache fetch comprising two branch instructions, information (e.g., target address, direction, etc.) for the two branch instructions may be found in sides A and B, respectively.

For conditional branch prediction, the BTAC may use a tagged geometric (TAGE) predictor, which includes multiple tables each having global branch history patterns of different lengths. Academia has written extensively on TAGE predictors, and in particular, recommended actions (e.g., write policies or allocations) to take on updates to the tables based mispredictions. However, since some microprocessors use hardware implementations of TAGE predictors, recommendations that are alleged to improve performance are not readily implemented after tape-out for a given chip.

SUMMARY

In one embodiment, a microprocessor, comprising: prediction logic comprising a branch predictor comprising at least a first side and a second side, each of the first and second sides comprising a group of multi-set associative tables, each of the tables corresponding to branch pattern histories of different lengths; and control logic configured to provide an adjustable write policy for the prediction logic.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

FIG. 1B is a schematic diagram showing an example front end of the branch unit pipeline shown in FIG. 1A.

FIG. 2B is a schematic diagram that shows an embodiment of an example control logic used in the adjustable branch prediction system of FIG. 2A.

FIG. 3 is a flow diagram that shows an embodiment of an example adjustable branch prediction method.

FIG. 4 is a flow diagram that shows an embodiment of another example adjustable branch prediction method.

DETAILED DESCRIPTION

Figure 1A:
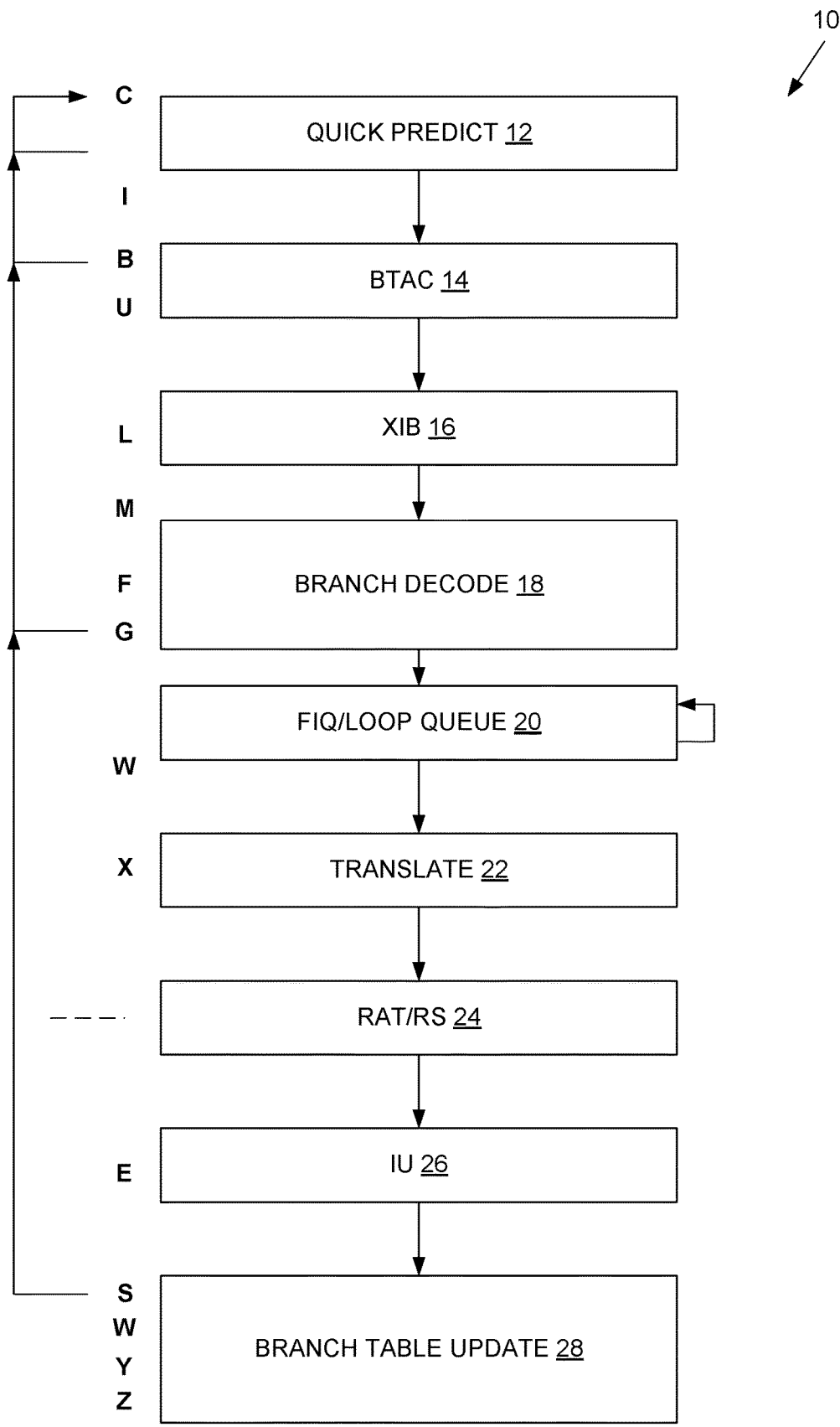
FIG. 1A is a block diagram showing an example branch unit pipeline for a microprocessor in which an embodiment of an adjustable branch prediction system is implemented.

Certain embodiments of an adjustable branch prediction system and method are disclosed that are configured to provide an adjustable write policy for prediction logic used in a branch prediction pipeline of a microprocessor. In one embodiment, the adjustable branch prediction system comprises a programmable feature control register that is configurable by microcode, as possibly adjusted via patch code, to enable selection of one of a plurality of write policies for plural prediction tables, even after tape-out of the microprocessor chip. Accordingly, allocation schemes for each of the plural write policies for a misprediction may be tailored for the particular hardware implementation of the branch predictor for the microprocessor and/or tailored for the particular application for which the microprocessor is intended, consistent with the latest research on allocation schemes.

Digressing briefly, research on some branch prediction schemes like TAGE is often performed using software, where adjustments can be more easily implemented. In hardware implementations of branch prediction, changes may be costly, particularly if they occur after tape-out. In contrast, certain embodiments of an adjustable branch prediction system enables microcode-driven adjustments in the write policies of the predictor tables, enabling more flexibility to hardware-based branch prediction.

Having summarized certain features of an adjustable branch prediction system of the present disclosure, reference will now be made in detail to the description of an adjustable branch prediction system as illustrated in the drawings. While an adjustable branch prediction system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1A shows an embodiment of an example branch unit pipeline for a microprocessor 10. It should be appreciated that certain known components of a microprocessor 10 are omitted here for brevity and ease of explanation and illustration. As is known, the pipeline architecture provides for multiple instructions that are overlapped in execution, with each stage referred to as a pipe stage. The blocks shown in the branch unit pipeline may each be implemented according to one or more stages, those stages shown to the left of the blocks and represented in the depicted embodiment by the upper-case letters C, I, B, U, L, M, F, G, W, X, E, S, W, Y, and Z that are sequentially advanced from top-down and as redirected (as shown by the arrows). It should be appreciated by one having ordinary skill in the art that the number and/or arrangement of stages depicted in FIG. 1A is merely illustrative of one example embodiment, and that in some embodiments, a different number and/or arrangement of stages may be implemented and hence contemplated to be within the scope of the disclosure. It should also be appreciated by one having ordinary skill in the art that the blocks provide a general description of functionality for the branch pipeline, and that associated logic or circuitry known to those having ordinary skill in the art is omitted here for brevity. For instance, it should be appreciated by one having ordinary skill in the art that each stage of the pipeline may be separated by clocked pipeline registers or latches, as is known. As another example, though not explicitly shown in FIG. 1A, it should be appreciated by one having ordinary skill in the art that operations at the front end involve data exchange or interaction with an instruction cache.

An instruction cache is a random access memory device within a microprocessor into which the microprocessor places instructions of an ISA machine language program (such as x86 ISA machine language instructions) that were recently fetched and/or pre-fetched from larger cache (e.g., L2 cache, L3 cache) or system memory (e.g., fetched and/or pre-fetched from DRAM by a bus interface unit) and performed by the microprocessor in the course of running the ISA machine language program. The ISA defines an instruction address register that holds the memory address of the next ISA instruction to be performed (defined by the x86 ISA as an instruction pointer (IP) though sometimes referred to as a program counter (PC)), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data (i.e., that is accessed based on an instruction address register value and on a load/store address, but not exclusively based on a load/store address) is intended to be included in the definition of an instruction cache for purposes of the present disclosure.

Directing attention in particular to the branch unit pipeline of the microprocessor 10 of FIG. 1A, the microprocessor 10 comprises a pipelined microprocessor whose instruction set, in one embodiment, conforms substantially to the x86 architecture instruction set. As will be appreciated by persons having ordinary skill in the art from the description provided herein, the present invention may be implemented in a variety of various circuit configurations and architectures, and the architecture illustrated in FIG. 1A is merely one of many suitable architectures. The example microprocessor 10 comprises a quick predictor 12, branch target address cache (BTAC) 14, instruction byte queue (XIB) 16, a branch decoder 18, format instruction queue (FIQ)/loop queue 20, instruction translator 22, register alias table (RAT)/reservation stations (RS) 24, functional units (e.g., integer unit, floating point unit, etc.) 26, and a branch table update 28. Each of the numerically-referenced blocks of the microprocessor 10 correspond to logical circuits that are implemented over the corresponding plurality of stages C, I, B, U, L, M, F, G, W, X, E, S, W, Y, and Z, with the pipeline architecture enabling different groups of instructions at every stage. In one embodiment, four or more instructions may be run at every stage, with control signals marking each stage along the pipeline. Stages in association with the quick predictor 12, BTAC 14, and XIB 16 involve accesses to an instruction cache (I-cache, not shown in FIG. 1A).

The quick predictor 12 comprises a single cycle branch predictor that provides for single cycle prediction (e.g., takes one cycle to produce a target address, the prediction provided at the I stage in one embodiment). In one embodiment, the quick predictor 12 comprises a table (also referred to herein as array or target array) that stores branch target addresses of previously executed branch instructions, the table enabling a branch prediction when the stored branch instructions are subsequently encountered. In one embodiment, the table comprises 128 entries, though tables of other sizes (e.g., 64 entries, 32 entries, etc.) may be used in some embodiments. The table is organized as an n-way (e.g., n is an integer greater than one) set associative cache. Generally, an n-way set associative cache is also referred to herein as a multi-set associative cache. In one embodiment, each entry stores eight (8), 3-bit counters and the current local branch pattern, the counter chosen by a 3-bit local branch pattern. The quick predictor 12 further comprises a conditional branch predictor that is accessed in parallel with the table and that provides a taken/not taken direction for conditional branches. The quick predictor further comprises a return stack that can provide a target instead of the table. In one embodiment, the return stack comprises four (4) entries and provides the target for return instructions. Note that the specifications listed above are merely for illustration, and that some embodiments may perform under different specifications and hence are contemplated to be within the scope of the invention. The quick predictor 12 is configured to deliver a predicted branch target immediately (within a single cycle) with no taken branch penalty. In some embodiments, the quick predictor 12 may operate according to other specifications for its prediction mechanism and/or table configuration, or in some embodiments, may be omitted.

Most branches are correctly predicted by the quick predictor 12. In some embodiments, where the quick predictor 12 provides a branch prediction that differs (e.g., difference in direction and/or target) from the branch prediction of the BTAC 14 based on the same fetched branch instruction, the BTAC 14 overrides the branch prediction of the quick predictor 12 and updates the quick predictor table within the set of stages of the BTAC 14, for instance, at the U stage, with the branch prediction information (e.g., direction, target address, branch prediction type) provided by the BTAC 14.

The I stage and/or B stage correspond to access to the various tables of the branch unit pipeline, including the I-cache, tag arrays, translation lookaside buffer (TLB) arrays, BTAC arrays, return stack arrays, etc., muxing out the direction or way (e.g., based on the tags), and reading out of the instructions.

The BTAC 14 holds information about previously executed branch instructions that it uses to predict the target address, direction, and type during subsequent executions. The BTAC 14 comprises one or more tables that are much larger than the table of the quick predictor 12. In one embodiment, the BTAC 14 comprises a 4 k entry, m-way set-associative table (also referred to herein as array or target array), where m is an integer greater than one. Similar to n-way set-associative tables, m-way set-associative tables may also be referred to herein as multi-set associative tables. Each entry of the BTAC 14 comprises a valid bit, a branch target address prediction, a direction prediction, and a branch type. The branch type specifies whether the branch instruction is a call/return, indirect branch, conditional relative branch, or unconditional relative branch. In one embodiment, the BTAC 14 comprises or cooperates with a conditional relative branch predictor (or simply, conditional branch predictor) having a multiple entry (e.g., 12 k) tagged geometric (TAGE)-based conditional branch predictor, multiple tables, a multi-bit (e.g., 3 bit), taken/not taken (T/NT) counter, and multi-bit global branch history. That is, the TAGE conditional branch predictor comprises tagged tables with geometrically increasing branch history lengths, as is known. As another example, the indirect prediction comprises a multiple entry (e.g., 1.5 k) TAGE predictor and uses the table entries for static indirect branches. In one embodiment, two TAGE conditional branch predictors are used, one for side A and one for side B in a predictor array. The TAGE conditional branch predictor may be part of the BTAC or used in conjunction with the BTAC 14.

In one embodiment, the BTAC 14 comprises or cooperates with a second type of conditional branch predictor of lower complexity than the TAGE conditional branch predictor, for instance a gshare predictor associated with side C of the predictor array. The gshare conditional branch predictor may be a part of the BTAC 14 or used in conjunction with the BTAC 14. The gshare conditional branch predictor comprises a complexity in between that of the quick predictor 12 and the TAGE conditional branch predictors (e.g., approximately $\frac{1}{10}^{th}$ the size of the TAGE conditional branch predictor). In one embodiment, the gshare conditional branch predictor comprises a single table (e.g., m-bit global history register comprising a branch pattern of the last m executed branch instructions, where m is typically 10-12 bits though not limited to that quantity). The gshare conditional branch predictor uses a global branch history and a location (e.g., IP) of a branch instruction to create (via an XOR logical operation) an index into a table of counters (e.g., 2-bit counters), where the result of the index is a prediction for the current branch. As TAGE and gshare type conditional branch predictors are known in the art, further description of the same is omitted here for brevity. Further, though sides A, B, and C are emphasized herein, in some embodiments fewer or additional sides may be used. Note that in some embodiments, other types of prediction mechanisms may be used, including correlation-based prediction mechanisms, conditional branch predictors that use a combination of global and local branch history, etc. For each portion, or fetch quantum, of a cache line of the instruction cache (e.g., 16 bytes), the BTAC 14 can hold three entries (e.g., sides A, B, and C, though fewer sides may be used in some embodiments for storing prediction information for fewer branch instructions) that can hold prediction information for up to three branch instructions that may be present in a portion of the cache line. The BTAC 14 comprises operations through a set of stages (e.g., the I, B and U stages). In effect, the U stage of a branch instruction serves as a C stage for the target (e.g., the arrow from the B stage to the C stage reflects the situation of the branch instruction at the B stage and the next clock is the C stage of the target or herein also, the cache address), resulting in a two-clock delay for BTAC prediction.

The BTAC 14 has a two clock taken penalty, which also reveals a benefit of the quick predictor 12 in providing a rapid branch prediction (no taken penalty) by immediately steering the new cache address to be the target. In one embodiment, the BTAC 14, being larger than the quick predictor 12 and having a more sophisticated branch prediction mechanism, is configured to (e.g., always) override the branch prediction of the quick predictor 12 when there is a disagreement in branch prediction (e.g., the BTAC 14 determines a different branch prediction than the taken determination and/or branch target address determined by the quick predictor 12). In some embodiments, the BTAC 14 is configured to update the quick predictor 12 during one of the BTAC stages (e.g., the U stage) by writing the branch prediction information into the table of the quick predictor 12 (and also in the tables of the BTAC 14). In some embodiments, updates to the BTAC 14 are delayed until a branch is executed or retired, where the updates to the BTAC 14 involve writes to the predictor tables of the BTAC 14. In one embodiment, updates involve target information and/or counter updates. The updates include a write of mispredicted conditional branch information to one of the sides A, B, or C. In some embodiments, the updates are performed according to one of a plurality of selectable write policies for sides A and B corresponding to respective TAGE conditional branch predictors. However, updates to the quick predictor 12 do not wait that long, occurring during a BTAC stage. Note that branches that are not in the quick predictor 12 are written into the quick predictor 12 two cycles later at a time corresponding to (e.g., during) a BTAC stage.

The XIB 16 is a queue of entries, each of which holds sixteen bytes of data from the instruction cache. For instance, the cache data that comes from the XIB 16 is simply a stream of instruction bytes that comes in sixteen byte blocks, and it is unknown where a given x86 instruction begins or ends within the stream or within a given block given that instructions are of variable length. The XIB 16 comprises known logic to determine and mark the beginning and ending byte of each instruction within the stream and thereby break up the stream of bytes into a stream of x86 instructions, which is provided to and stored in the FIQ/loop queue 20 for processing by the remainder of the microprocessor pipeline. In the L (length) stage, the XIB 16 determines the instruction lengths. In one embodiment, a predecoder (not shown in FIG. 1A) is implemented at the U stage, and is configured to detect potential branch instructions and mark them as such for each instruction byte in the queues. Notably, at this stage, there is ambiguity as to whether a given byte is the start of an instruction. If a byte is an opcode byte of a branch instruction determined at a later (M stage), then the instruction is affirmed as a branch instruction. For instance, the branch decoder 18 comprises an instruction mux (not shown) for muxing instructions in a mux or M stage, where the branch instructions are affirmed as such. Note that additional information on branch decoding may be found in U.S. Pat. No. 8,473,726, incorporated herein by reference in its entirety to the extent consistent with the current disclosure.

In the F stage, the instructions are formatted. In one embodiment, the formatted instructions comprise instructions conforming substantially to the x86 architecture instruction set. Also, a determination is made at the M stage whether a given instruction, perhaps marked preliminarily by the predecoder, was indeed a branch or not. For instance, where a miss occurred in the quick predictor 12 or BTAC 14 (e.g., at initial start-up), the branch decoder 18 (e.g., the instruction mux) decides the current instruction is a branch and redirects at stage G the cache address to the new target and update the tables in the front end of the microprocessor 10. In effect, the branch decoder 18 provides for branch prediction when missed at the quick predictor 12 or BTAC 14, where the branch instruction transitions to the target at the C stage. In some circumstances, such as where there are more than a limited or predetermined maximum number of branches per fetch (e.g., more than three per 16 byte fetch) at the BTAC 14, branch prediction for the extra branch is delayed until decode time.

The FIQ/loop queue 20 receives the formatted instructions and buffers them until they can be translated into microinstructions. The FIQ/loop queue 20 also provides for a preliminary decoding and fast looping function (e.g., on a BTAC loop branch, the loop queue is activated and loop instructions are repeatedly sent), the latter represented by the arrow at the right hand side of the block 20.

The W stage provides for an optional extra timing clock.

At the X stage, the instruction translator 22 translates (in the X or translate stage) the formatted instructions stored in the FIQ/loop queue 20 into microinstructions.

The instructions are provided in program order to a register alias table/reservation tables (RAT/RS) 24. The RAT functionality of the RAT/RS 24 maintains and generates dependency information for each instruction. The RAT functionality of the RAT/RS 24 renames the sources and destinations of the instructions onto internal registers, and dispatches the instructions to reservation stations of the RAT/RS 24, which issue the instructions, potentially out of program order, to functional units 26. The functional or execution units 26, which include integer units, execute branch instructions at stage E (execution). Execution units, branch units, and integer units are terms that are used interchangeably herein. In one embodiment, the execution units 26 (e.g., two execution units) execute two branches in a single clock cycle. The execution units 26 also indicate whether the BTAC 14 has correctly predicted the branch instruction.

Results of the execution are provided in one embodiment to a reorder buffer (not shown), which comprises information pertaining to instructions that have been executed. As is known, the reorder buffer keeps the original program order of instructions after instruction issue and allows result serialization during a retire stage. In one embodiment, some of the information of the reorder buffer may be stored elsewhere along the pipeline, such as at the decoder 18.

Information stored in the reorder buffer may include branch information, such as type of branch, branch patterns, targets, the tables used in the prediction, and cache replacement policy information (e.g., least recently used or LRU).

The branch table update 28 comprises stages S, W, Y, and Z, and is configured to update (e.g., at the S stage) the various tables at the front end (e.g., BTAC, TAGE) with information about the fully decoded and executed branch instruction (e.g., the final result of the branch). The update may involve, at stages S, W Y, and Z, a table read, a target address write, and a counter increment or decrement, which may involve some delays. In one embodiment, the branch table update 28 provides an indication of a misprediction for a given conditional branch instruction and the side (e.g., A, B, or C) in which the conditional branch instruction is cached.

Referring now to FIG. 1B, with continued reference to FIG. 1A, shown is an example quick predictor 12 and other example sources used at a front end 30 of the branch unit pipeline shown for the microprocessor 10 of FIG. 1A. The front end 30 comprises a fetch unit 32 (e.g., including a mux and clocked register), a translation lookaside buffer (TLB) 34, an instruction cache (I-cache data) 36, I-cache tag 38 (or tag array), the BTAC 14, and the quick predictor 12. The fetch unit 32 receives plural sources of cache instruction addresses, including a sequenced instruction address (e.g., from the I-stage), corrected instruction address (e.g., from the S stage), decode time instruction address (e.g., from the G stage), and addresses from the BTAC 14 and quick predictor 12. The output of the fetch unit 32 is a cache address that is provided as inputs to the TLB 34, I-cache data 36, I-cache tag 38, BTAC 14, and quick predictor 12 for accessing the next instruction of the I-cache data 36.

The TLB 34, under management by a memory management unit (not shown), provides for a virtual to physical page address translation as is known. That is, the TLB 34 stores the physical addresses of the most recently used virtual addresses. The TLB 34 receives a linear address from a segmentation unit (which converts the logical address from a program into the linear address), and a portion of the linear address is compared to the entries of the TLB 34 to find a match. If there is a match, the physical address is calculated from the TLB entry. If there is no match, a page table entry from memory is fetched and placed into the TLB 34.

The I-cache data 36 comprises a level 1 cache of instructions that have been fetched or prefetched from L2, L3 or main memory. The I-cache data 36 comprises multiple clocked registers.

The I-cache tag 38 comprises an array of tags corresponding to the instructions in the I-cache data 36, and comprises multiple clocked registers, and is used to determine a match between information associated with the fetched cache instruction (e.g., the tag or portion of the cache address) to the I-cache data 36 and BTAC 14.

The BTAC 14 is explained above in association with FIG. 1A, and has multiple clocked registers and a two (2) clock taken penalty. The quick predictor 12, also explained above, has a zero (0) clock taken penalty. For instance, assume fetches along the I-cache at 16 bytes per cycle, and assume a branch instruction at cache address 20 to cache address 95. Note that hexadecimal notation (e.g., 0x0, 0x10, 0x20, etc.) is implied by the address descriptions in this example. Thus, fetches occur at cache address 0, cache address 10, cache address 20 (the branch instruction, but not yet resolved since the BTAC 14 read and mux span multiple cycles, which in some embodiments is the same timing as the I-cache), cache address 30 (relative clock 1), cache address 40 (relative clock 2), and then on the $3^{rd}$ clock (relative clock 3), the cache instruction fetch is redirected to cache address 95. The taken branch penalty thus comprises two clock cycles in this example, since cache address 30 and 40 occur after the branch. In other words, without the quick predictor 12, the taken branch penalty is always two clocks for this particular design example. With the smaller and faster quick predictor 12, the cache address fetches, in the above example, comprise 0, 10, 20 and 95, with no delay on the cache address and zero taken penalty. As noted above, in some embodiments, the quick predictor 12 may be omitted.

Figure 2A:
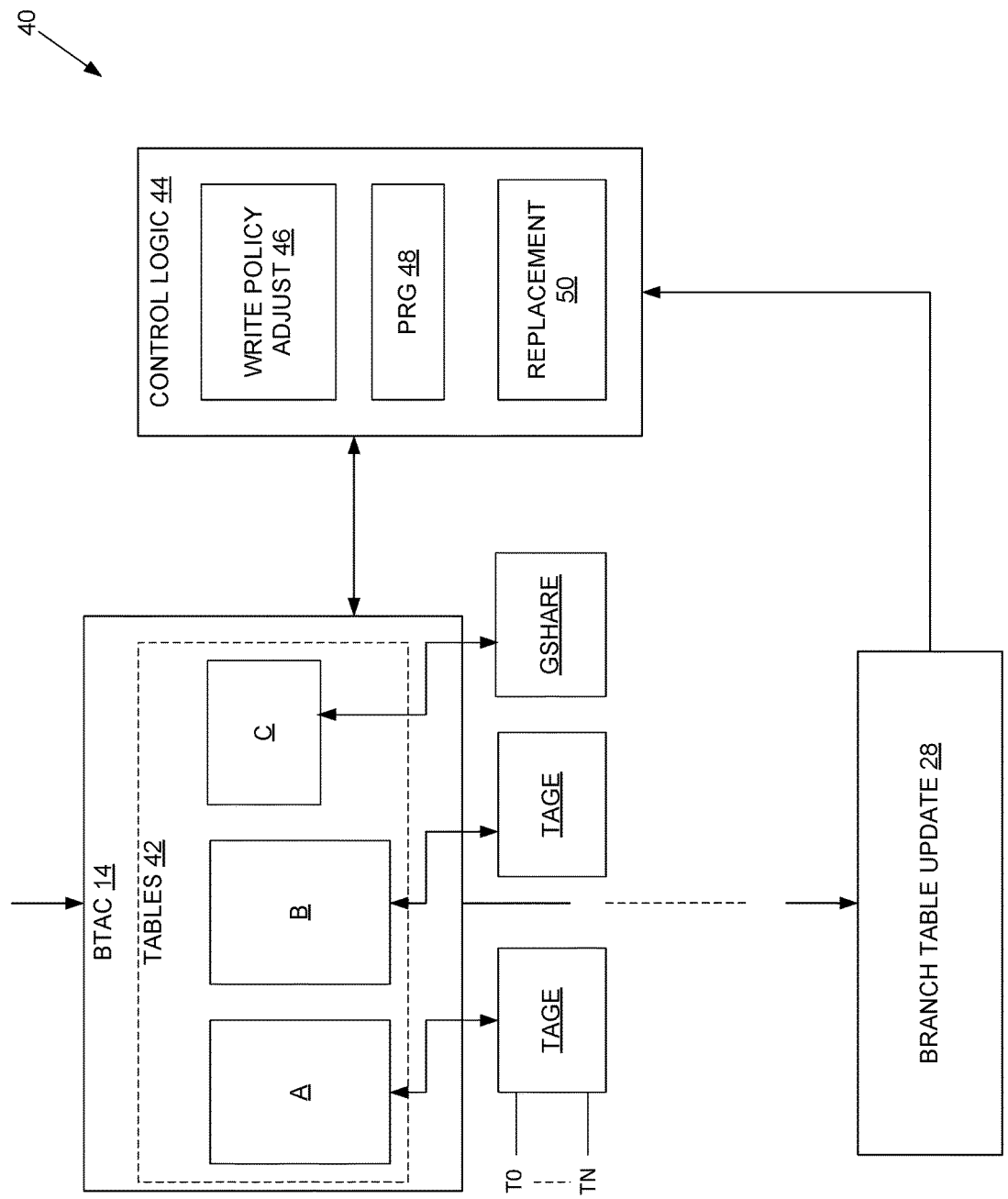
FIG. 2A is a schematic diagram that shows an embodiment of an example adjustable branch prediction system.

Attention is now directed to FIG. 2A, which shows an embodiment of an example adjustable branch prediction system 40. In one embodiment, the adjustable branch prediction system 40 comprises the BTAC 14 having or coupled to conditional branch prediction tables 42, the branch table update 28, and control logic 44, which includes and/or cooperates with write policy adjust logic 46, a pseudo-random generator (PRG) 48, and cache entry replacement logic 50. Note that other portions of the pipeline are omitted here for brevity, though it should be appreciated that the pipeline functions as described above in association with FIGS. 1A-1B. In some embodiments, fewer or additional components may be considered as comprising the adjustable branch prediction system 40 and/or the control logic 44. In one embodiment, the branch prediction tables 42 (or simply referred to as tables) comprise a first side (A), a second side (B), and a third side (C), though a different number of sides may be used in some embodiments. Each of the first and second sides A, B comprises a group of multi-set associative tables corresponding to respective first conditional branch predictors, or more specifically, TAGE conditional branch predictors (one for side A, one for side B). The third side comprises a single table comprising a single conditional branch predictor (e.g., gshare conditional branch predictor), though in some embodiments, the third side may be omitted or associated with a different conditional branch predictor and/or number of tables. The plural tables T0-TN are in respective sides A and B, where N is an integer number greater than one and typically five (or effectively more if counting the ways) of different complexity global branch patterns. It should be appreciated by one having ordinary skill in the art that both the BTAC 14 and the conditional branch predictors (TAGE, gshare) have a multi-sided array (each having sides A, B, and C). For instance, if a branch exists in side B of the BTAC 14, it also exists in side B of the conditional predictors. As shown in FIG. 2A, each of sides A, B of the prediction tables 42 have a separate TAGE conditional predictor, and side C has a gshare conditional branch predictor. Note that reference herein to prediction logic includes the prediction tables, including their particular structure and/or arrangement, the read and write policies, and the prediction algorithm or method.

As shown in FIG. 2A, the branch table update 28 provides information to the control logic 44, including whether a given conditional branch instruction is mispredicted and where (e.g., which side, which way) the offending (mispredicted) conditional branch instruction is cached. The control logic 44 cooperates with the write policy adjust logic 46, PRG 48, and cache entry replacement logic 50 to write branch instruction information to the sides A, B, or C. For instance, for the TAGE conditional branch predictors, the write policy adjust logic 46, described further below in association with FIG. 2B, controls the choice of write policy taken on misprediction, where the allocation to the tables may be apportioned in part according to the allocated percentage values for the tables provided by the pseudo-random generator 48. The cache entry replacement logic 50 comprises an array that utilizes one of a plurality of known cache entry replacement schemes. For instance, in one embodiment, a least recently used (LRU) replacement algorithm is used. The cache entry replacement logic 50 controls an address mux (not shown) to select an update address when the control logic 44 updates (writes to) the tables 42 (e.g., choosing between sides A or B). The cache entry replacement logic 50 stores replacement information for each of the sides A, B, and C. Thus, the cache entry replacement logic 50 is a global resource shared between the sides of the tables 42. In one embodiment, the replacement information includes bits for indicating which of the sides and which of the ways of each side was least recently used, which the control logic 44 uses to perform the writes to the tables 42. The control logic 44 also controls updates to the LRU array of the cache entry replacement logic 50.

With continued reference to FIG. 2A, attention is directed to FIG. 2B, which shows an embodiment of the policy adjust logic 46. It should be appreciated by one having ordinary skill in the art from the present disclosure that the example shown in FIG. 2B is one illustrative example, and that in some embodiments, a different circuit may be used to perform a similar function. The policy adjust logic 46 comprises a fuse bank 52, patch memory (e.g., patch read-only memory or ROM) 54, microcode memory (e.g., microcode ROM) 56, a programmable feature control register (FCR) 58, and a mux select 60. In general, one of a plurality of write policies are selected by the FCR 58, which allows microcode-driven adjustment of the TAGE predictors (and allows for this adjustment even after tape-out) via the patch ROM 54. The patch ROM 54 comprises privileged code (e.g., authorized or supervisory). The fuse bank 52 comprises a plurality (e.g., hundreds, thousands, etc.) of physical fuses that are selectively blown or ruptured through the receipt from an entity (e.g., chip design manufacturer, chip manufacturer, etc.) of an overcurrent signal(s). The microcode ROM 56 is configured to read the fuse bank 52 and sets the registers of the FCR 58 accordingly. The fuse bank 52 and microcode ROM 56 comprise known technology, and hence further description of the same is omitted here for brevity. The patch ROM 54 comprises microcode that replaces portions of microcode in the microcode ROM 56. Through this replacement, instructions may be treated differently. For purposes of the FCR 58, default values for various logical functions may be initially set (e.g., at tape-out time). The patch ROM 54 may replace portions of the microcode ROM 56, which in turn selectively reads one or a combination of fuses of the fuse bank 52 to make adjustments to the FCR 58 to amend or adjust the default values, and in the present embodiment, to prompt changes in the TAGE conditional branch predictor write policies. Accordingly, through implementation of the policy adjust logic 46, default values may be set and reset (e.g., adjusted) at chip manufacturing time and at run time (e.g., when the chip is booted up in a test environment).

The output of the FCR 58, through the various bit settings, may result in altered functions for a plurality of different logic functions (e.g., loop queue detection, indirect table write policies, etc.) in the microprocessor 10. In the present embodiment, two bits are used to control the selection by the mux select 60 of four different write policies (e.g., set up using RTL). In other words, one of the allocation schemes associated with each of the four different write policies is selected on misprediction, where the allocations are to a next highest table or some mix of tables. In one embodiment, the four different write policies based on five (5) TAGE tables T0-T4 are shown in Table 1, with the understanding that variations to the action on misprediction, the quantity of write policies, and/or the proportional allocation for each table may differ in some embodiments:

TABLE 1

| Write Policy | Action on Misprediction |
|---|---|
| WP0 | Allocate to next higher table always |
| WP1 | Allocate to multiple tables: 50% (T1, T3), 25% (T2, T4) |
| WP2 | Allocate to next table (75%) and to next table +1 (25%) |
| WP3 | Allocate to next table (50%), next +1 (25%), next +2 (25%) |

Note that table complexity increases from T0-T4. As an example, if WP0 is selected and misprediction was from table T0, then the allocation for the update is always to the next higher table (e.g., T1). The cache entry replacement logic 50 determines whether that allocation is to side A or side B. Note that reference to the term allocate (or similarly, allocation, etc.) refers to choosing a prediction table and entry in that table to put the prediction in. For instance, if a branch only has an entry in T0 of the TAGE conditional branch predictor, and it mispredicts, allocation is to a new entry in the next higher table like T1 (assuming write policy or WP0). The higher tables comprise longer branch patterns and are more accurate on average, but due to space constraints, not every branch can be allocated to higher tables. Further, in some embodiments, the entry in Table 0 (T0) remains (with counters updated to reflect the branch direction). Note that the quantity of tables is illustrative of one example embodiment, and that in some embodiments, other quantities may be used.

Figure 2C:
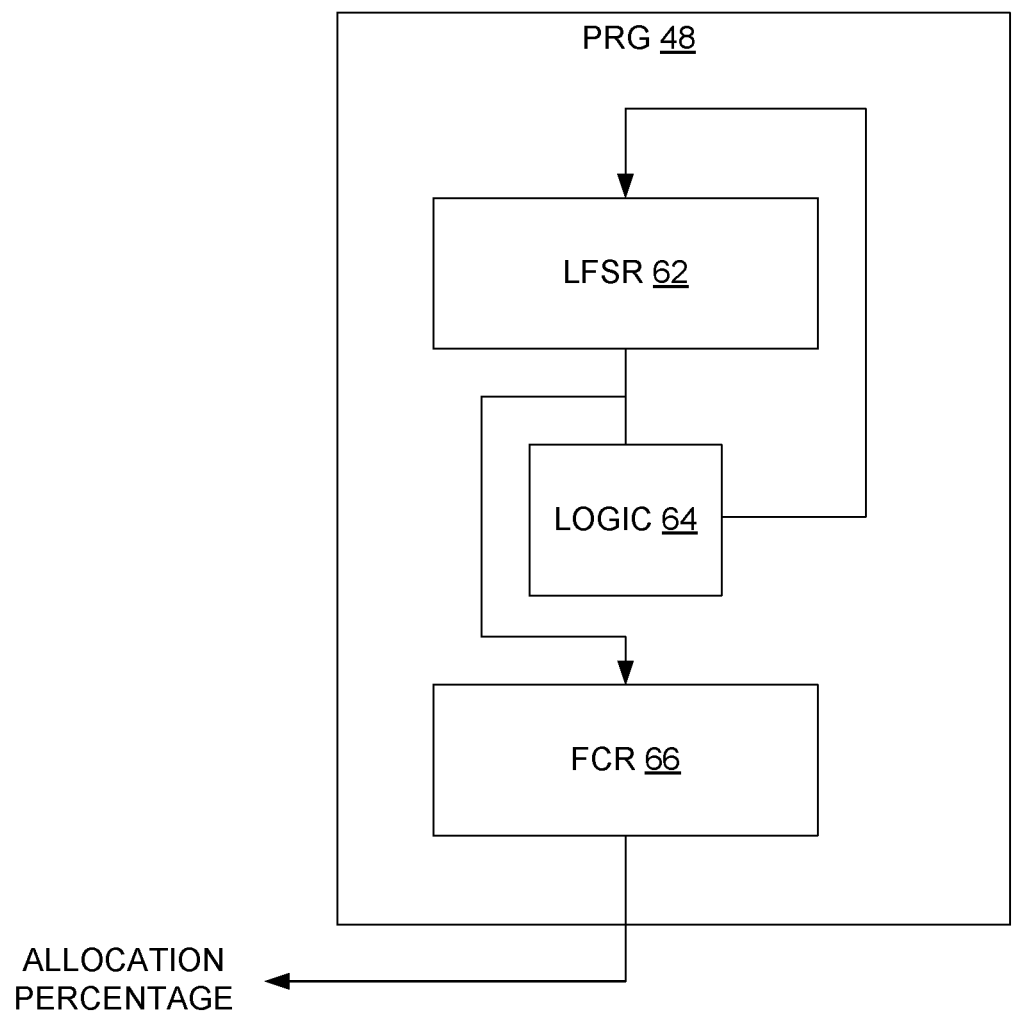
FIG. 2C is a schematic diagram that shows an embodiment of an example pseudo-random generator used in the adjustable branch prediction system of FIG. 2A

Implementation of the write policies that use a percentage allocation to the various tables (e.g., WP1-WP3) rely on the pseudo-random generator 48, an example of which is shown in FIG. 2C. That is, the pseudo-random generator 48 is used after a write policy is chosen. For instance, assume the FCR-generated, 2-bit value causes selection by the mux select 60 of write policy 2 (WP2, where allocation is to the next table 75% of the time and next+1 table 25% of the time). The pseudo-random generator 48 is used to create the 75% signal pseudo-randomly. Note that the logic that makes up the pseudo-random generator 48 provides for a better result than just using a simple counter that has, say, 3 out of 4 states active to signal 75% of the time, since the simple counter can harmonize with a certain branch and always signal one way or the other. In one embodiment, the pseudo-random generator 48 comprises a linear feedback shift register (LFSR) 62, processing logic 64, and a feature control register (FCR) 66. In one embodiment, the LFSR 62 comprises seven (7) bits that are fed to the processing logic 64, which in one embodiment comprises an inverter. Note that the use of seven bits is merely illustrative of one example, and in some embodiments, other size registers may be used. In effect, the LFSR 62 and processing logic 64 produce every possible value for 7 bits (e.g., cycles through all of the 2^7 states (except all zeroes) in pseudo-random order). A portion of the bits (e.g., a 5-bit sample, though not limited as such) is provided to the FCR 66, which selects the desired percentage values in a pseudo-random manner. In one embodiment, the FCR 66 is programmable (e.g., via a physical or software/microcode adjustment).

In view of the above description, it should be appreciated by one having ordinary skill in the art that one adjustable branch prediction method, denoted method 68 in FIG. 3 and implemented in one embodiment by the control logic 44, comprises replacing microcode with a patch (70), reading a fuse bank with microcode from the patch (72), setting bits of a feature control register based on the read (74), using the set bits to enable a mux select of one of plural write policies involving one or more prediction tables (76), and based on a misprediction, writing to the one or more prediction tables based on the selected write policy (78).

Having described certain embodiments of an adjustable branch prediction system 40 (FIGS. 2A-2C) and method 68 (FIG. 3), it should be appreciated that one embodiment of an adjustable branch prediction method, denoted as method 80 in FIG. 4, is implemented in a microprocessor having prediction logic comprising a predictor comprising a group of multi-set associative tables, each of the tables corresponding to branch pattern histories of different lengths. The adjustable branch prediction method 80 comprises receiving a write policy control signal (82); and selecting one of a plurality of selectable write policies for the prediction logic based on the write policy control signal (84).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A microprocessor, comprising:
   prediction logic comprising a branch predictor comprising a group of multi-set associative tables, each of the tables corresponding to branch pattern histories of different lengths; and
   control logic configured to provide an adjustable write policy for the prediction logic.

2. The microprocessor of claim 1, wherein the control logic is configured to enable the adjustable write policy after tape-out.

3. The microprocessor of claim 1, wherein the adjustable write policy comprises an allocation scheme selected from among a plurality allocation scheme involving one or more of the tables.

4. The microprocessor of claim 3, wherein conditional branch prediction by the prediction logic based on the selected allocation scheme is performed based on a misprediction.

5. The microprocessor of claim 3, wherein the control logic comprises a pseudo-random generator, the control logic configured to implement the allocation scheme according to a percentage allocation to the respective tables.

6. The microprocessor of claim 1, wherein the control logic comprises a feature control register and a mux select logic, the mux select logic configured to select one of a plurality of write policies based on a bit setting of the feature control register.

7. The microprocessor of claim 6, wherein the control logic comprises a fuse bank and microcode memory, the microcode memory configured to read the fuse bank and based on the read, provide a change in the bit setting of the feature control register.

8. The microprocessor of claim 7, wherein the fuse bank comprises a plurality of fuse settings that are individually selectable via privileged microcode.

9. The microprocessor of claim 8, wherein the control logic further comprises patch memory, the patch memory configured to replace select portions of the privileged microcode.

10. The microprocessor of claim 1, wherein the branch predictor comprises a TAGE conditional branch predictor.

11. An adjustable branch prediction method implemented in a microprocessor having prediction logic comprising a branch predictor comprising a group of multi-set associative tables, each of the tables corresponding to branch pattern histories of different lengths, the adjustable branch prediction method comprising:
   receiving a write policy control signal; and
   selecting one of a plurality of selectable write policies for the prediction logic based on the write policy control signal.

12. The adjustable branch prediction method of claim 11, wherein the receiving and selecting is performed after tape-out.

13. The adjustable branch prediction method of claim 11, further comprising implementing an allocation scheme corresponding to the selected one of the write policies, the allocation scheme involving one or more of the tables.

14. The adjustable branch prediction method of claim 13, further comprising performing conditional branch prediction according to the selected allocation scheme based on a misprediction.

15. The adjustable branch prediction method of claim 13, further comprising implementing the allocation scheme according to a pseudo-random generated percentage allocation to the respective tables.

16. The adjustable branch prediction method of claim 11, further comprising selecting one of a plurality of write policies based on a bit setting of a feature control register.

17. The adjustable branch prediction method of claim 16, further comprising reading a fuse bank and based on the reading, providing a change in the bit setting of the feature control register.

18. The adjustable branch prediction method of claim 17, further comprising selecting one or more of a plurality of fuse settings via privileged microcode.

19. The adjustable branch prediction method of claim 18, further comprising replacing select portions of the privileged microcode using code from a patch memory.

20. The adjustable branch prediction method of claim 11, wherein the branch predictor comprises a TAGE conditional branch predictor.

* * * * *